(12) United States Patent
Groer et al.

(10) Patent No.: US 7,660,662 B2
(45) Date of Patent: Feb. 9, 2010

(54) FAULT CODE MEMORY ADMINISTRATOR WITH A DRIVING CYCLE STATE MACHINE CONCEPT

(75) Inventors: Frank S. Groer, West Bloomfield, MI (US); Tomislav I. Golub, Birmingham, MI (US)

(73) Assignee: Detroit Diesel Corporation, Detroit, MI (US)

( * ) Notice: Subject to any disclaimer, the term of this patent is extended or adjusted under 35 U.S.C. 154(b) by 250 days.

(21) Appl. No.: 11/940,026

(22) Filed: Nov. 14, 2007

(65) Prior Publication Data
US 2008/0162024 A1 Jul. 3, 2008

Related U.S. Application Data

(60) Provisional application No. 60/877,457, filed on Dec. 28, 2006.

(51) Int. Cl.
G06F 19/00 (2006.01)
G06F 17/30 (2006.01)
G01M 17/00 (2006.01)

(52) U.S. Cl. .......................... 701/114; 701/29; 701/35; 701/103; 701/115; 340/438; 702/183

(58) Field of Classification Search ............ 701/29–35, 701/101–103, 111, 114, 115; 702/182–187; 340/438, 439, 441
See application file for complete search history.

(56) References Cited

U.S. PATENT DOCUMENTS

| 4,757,463 | A |   | 7/1988 | Ballou et al. |
| 5,265,468 | A | * | 11/1993 | Holst et al. ................. 340/441 |
| 5,482,013 | A | * | 1/1996 | Andrews et al. ............ 701/113 |
| 5,741,958 | A |   | 4/1998 | Denz et al. |
| 5,783,990 | A | * | 7/1998 | Dambach ................... 340/438 |
| 5,999,876 | A |   | 12/1999 | Irons et al. |
| 6,081,755 | A |   | 6/2000 | Fujimoto et al. |
| 6,112,150 | A |   | 8/2000 | Irons et al. |
| 6,127,947 | A |   | 10/2000 | Uchida et al. |
| 6,595,896 | B1 | * | 7/2003 | Gierling ..................... 477/39 |
| 6,647,334 | B2 | * | 11/2003 | Kizaki ........................ 701/29 |
| 6,691,957 | B2 |   | 2/2004 | Hess, Jr. et al. |
| 6,883,123 | B2 | * | 4/2005 | Hashimoto et al. ............ 714/55 |
| 6,944,531 | B2 | * | 9/2005 | Takizawa et al. ............ 701/114 |
| 7,021,588 | B2 |   | 4/2006 | Hess, Jr. et al. |
| 7,021,589 | B2 |   | 4/2006 | Hess, Jr. et al. |
| 2005/0159877 | A1 | * | 7/2005 | Hattori ....................... 701/101 |
| 2008/0074247 | A1 | * | 3/2008 | Plantamura ................. 340/438 |
| 2008/0125929 | A1 | * | 5/2008 | Prokhorov ................... 701/29 |
| 2008/0148827 | A1 | * | 6/2008 | Keski-Hynnila et al. ...... 701/29 |

* cited by examiner

*Primary Examiner*—Willis R Wolfe, Jr.
(74) *Attorney, Agent, or Firm*—Bill C. Panagos; Rider, Fishman & Grauer, PLLC

(57) ABSTRACT

A method to operate an electronic controlled diesel engine to provide enhanced fault code administration responsive to the variable driving cycle.

6 Claims, 2 Drawing Sheets

FAULT CODE MEMORY ADMINISTRATOR WITH A DRIVING CYCLE STATE MACHINE CONCEPT

CROSS-REFERENCE TO RELATED APPLICATIONS

The present application claims priority to U.S. Provisional Application Ser. No. 60/877,457 filed on Dec. 28, 2006, the contents of which are incorporated herein in their entirety.

BACKGROUND OF THE INVENTION

1. Field of the Invention

The present invention relates to a method to operate an electronic controlled internal combustion engine to provide enhanced fault code administration responsive to driving cycle.

The present invention further relates to a method of administering fault codes in an electronic control internal combustion engine that activates a warning indicator when a fault code is logged, and resets the warning indicator if the fault corrects itself is serviced, or in response to an initiation of a new drive cycle.

2. Description of the Related Art

Denz, et al., U.S. Pat. No. 5,741,958 disclose a method for detecting and documenting exhaust gas relevant malfunctions of a vehicle having an internal combustion engine in the fuel tank utilizing on board diagnosis. In the method, malfunctions are detected utilizing a sensor device and the malfunctions are evaluated in a circuit unit with the malfunctions including those malfunctions which are based on an empty tank. The fault announcements of the malfunctions are stored in a memory in dependence upon a pre-given number of drive cycles. A fuel level value indicative of the level of fuel in the fuel tank is determined and stored in the memory. Fault announcements of the malfunctions are outputted and stored in the memory in dependence upon the fuel level value thereby eliminating fault announcements of the malfunction based on an empty tank.

Irons, et al., U.S. Pat. No. 6,112,150 disclose a fault recognition system implemented as an adjunct to fault determination software of an on board engine control module (ECM). The ECM activates a "Type A" or "Type B" fault code for each signal received from a plurality of sensors disposed about the engine when that signal exceeds a predetermined threshold. A "Type C" fault is recognized and activated when all of a predetermined group of underlying "Type A" or "Type B" fault codes have been activated. The "Type C" fault is displayed, while the underlying faults may or may not be displayed. The "Type C" fault provides a better and more immediate indication of the source of the engine problem than any of the underlying faults. Only those underlying faults that aid in the recognition of the source of the underlying "Type C" fault are masked. When the "Type C" fault becomes inactive, any underlying fault codes are unmasked for subsequent evaluation. To avoid false positives or negatives, all of the underlying faults must be activated for a predetermined period before the "Type C" fault will be activated. Likewise, before the "Type C" fault is de-activated, at least one of the underlying faults must be inactive for a predetermined period.

Uchida, et al., U.S. Pat. No. 7,127,947 disclose a vehicle on board device having characteristics capable of being changed communicates with a vehicle to set a characteristic value to an optimum value. Parameters for setting conditions of an electronic device are called out of an $E^2$ PROM of the vehicle, and are transmitted to a technology center via a dealer, and an information center. Each dealer, the information center, and the technology center accumulate the parameters. The technology center can collect the parameters of numerous vehicles and characteristic values for electronic control of each of the vehicles and can calculate newest and optimum parameters. The technology center transmits this newest and optimum vehicle information to the vehicle, and each vehicle updates the parameters thereof to these newest and optimum parameters. Accordingly, the parameters of the vehicle are set as the newest parameters.

BRIEF SUMMARY OF THE INVENTION

The present invention is a method to operate an electronically controlled internal combustion engine, said engine equipped with an electronic control unit having memory resident therein; said electronic control unit in electronic communication with sensors to receive data signals indicative of operating information from various vehicle systems during a drive cycle. The method includes receiving data signals from at least one sensor indicative of at least one vehicle system operating condition; determining whether said data signals are indicative of a vehicle system fault; logging said fault in memory and activating a warning alert; and resetting said warning alert upon initiation of a new drive cycle.

The method may further include resetting a warning alert if the fault corrects itself or is serviced.

The drive cycle is defined as initiating engine ignition, operating the engine, and then disengaging engine ignition.

To determine whether a data signal is indicative of a fault, a comparison is made between the data signal and the engine operating values stored in tables in said ECU memory based upon a given engine speed or engine torque. The fault is indicated when the data signals are outside the range of values in memory for a given engine speed or engine torque. Finally, the method includes determining whether the fault exists for a predetermined time before logging into memory and activating the warning indicator to alert an operator.

DETAILED DESCRIPTION OF THE PREFERRED EMBODIMENT

Figure 1:
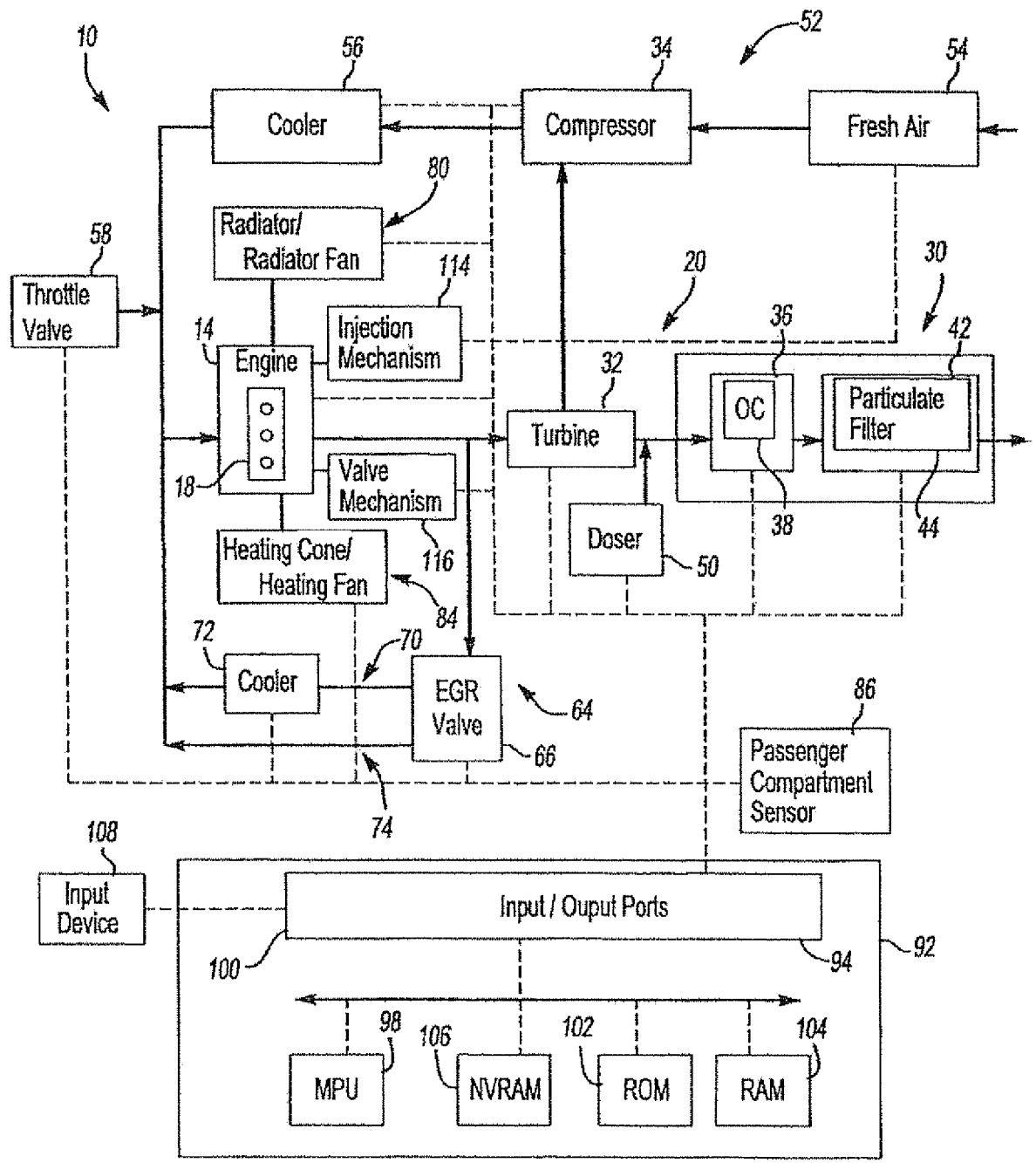
FIG. 1 is a schematic representation of an internal combustion engine, an electronic controller, and various attendant vehicle systems in electronic communication with said electronic controller.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away beat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 though the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, and that preferably eight such faults are stored in memory.

Figure 2:
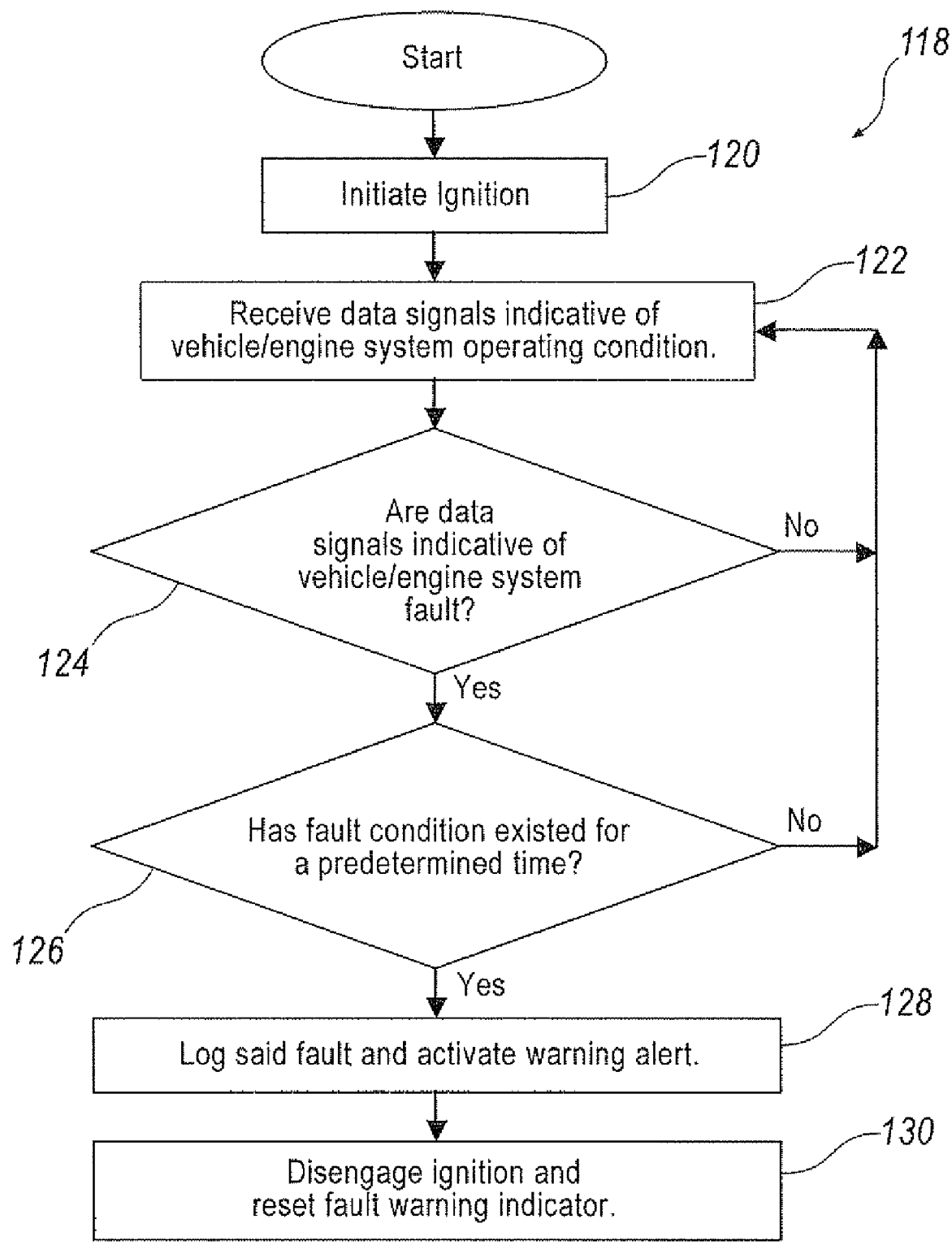
FIG. 2 is a schematic representation of a software flow chart of one method according to the present invention.

FIG. 2 is a schematic representation of a software flow diagram of one method 118 according to the present invention.

Specifically step 120 is initiating engine ignition. This step begins the drive cycle during which any faults that do not auto correct are stored in memory and a warning indicator is activated. Step 122 is receiving data signals indicative of vehicle or engine system operating conditions. The data signal may be transmitted by sensors in electronic communication with the electronic control unit. Those signals are compared against values stored in tables or maps in memory for a given engine operating condition such as engine torque or engine speed. If the sensed data signal is outside the stored values for a given operating condition, a fault condition may be indicated. Step 124 is determining whether the sensed fault condition existed for a predetermined period of time. The predetermined period of time is anytime sufficient to indicate that the sensed fault condition will not auto correct itself.

Generally, sensed faults may auto correct when a fault is sensed during engine warm-up periods or during the time prior to achieving an engine steady state conditions. In such a case, if the fault condition persists beyond achieving an engine steady state condition, an actual fault is indicated and step 126 is logging the fault into memory and activating a warning indicator to alert an operator of a fault condition. Depending upon the fault, other measures can be taken to protect the engine such as departing the engine or limiting fueling. At step 130, the ignition is disengaged and the warning indicator is reset The ignition disengagement resets the driving cycle so that upon reinitializing the ignition, a new drive cycle is initiated.

The words used throughout this description are words of description, not words of limitation. Those skilled in the art recognize that many variations and modifications are possible without departing from the scope and spirit of the invention as set forth in the appended claims.

What is claimed as new and desired to be protected by Letters Patent of the United States is:

1. A method to operate an electronically controlled internal combustion engine, said engine equipped with an electronic control unit (ECU) having memory resident therein; said electronic control unit in electronic communication with sensors to receive data signals indicative of operating information from various vehicle systems during a drive cycle:
   receiving data signals from at least one sensor indicative of at least one vehicle system operating condition;
   determining whether said data signals are indicative of a vehicle system fault;
   logging said fault in memory and activating a warning alert; and
   resetting said warning alert upon initiation of a new drive cycle.

2. The method of claim 1, further including resetting said warning alert if said fault corrects itself.

3. The method of claim 1, further including resetting said warning alert when said fault condition is serviced.

4. The method of claim 1, wherein said drive cycle is initiating engine ignition, operating said engine, and disengaging engine ignition.

5. The method of claim 1, wherein determining whether a data signal is indicative of a fault is made by comparing the data signal to engine operating values stored in tables in said ECU memory based upon a given engine speed or engine torque; said fault indicated when said data signals are outside said values for a given engine speed or engine torque.

6. The method of claim 1, further including determining whether said fault exists for a predetermined time before logging into memory and activating said warning indicator.

* * * * *